Dec. 9, 1969

J. H. SEXSTONE 3,482,488

MULTIPLE FILTER MANUFACTURE

Filed Jan. 12, 1968

INVENTOR
JOHN H. SEXSTONE
BY
ATTORNEYS

FIG. 11

INVENTOR
JOHN H. SEXSTONE
BY
ATTORNEYS

Dec. 9, 1969   J. H. SEXSTONE   3,482,488
MULTIPLE FILTER MANUFACTURE
Filed Jan. 12, 1968   6 Sheets-Sheet 5

INVENTOR
JOHN H. SEXSTONE
BY
ATTORNEYS

3,482,488
MULTIPLE FILTER MANUFACTURE

John H. Sexstone, Louisville, Ky., assignor to Brown & Williamson Tobacco Corporation, Louisville, Ky., a corporation of Delaware
Filed Jan. 12, 1968, Ser. No. 697,339
Int. Cl. A24c 5/50
U.S. Cl. 93—1                                42 Claims

ABSTRACT OF THE DISCLOSURE

A method and apparatus is provided for making a novel composite cigarette mouthpiece rod which is difusible into mouthpieces having at least three sections. Components of one character are fed in endwise and spaced relationship onto a moving conveyor. Components of the same or second character are similarly fed and placed between the first components. The interdigitated compounds of selected character are transferred onto a first wrapper moving on another conveyor traveling at a predetermined speed to provide a predetermined spacing of the components on the first wrapper. This wrapper is of a width slightly less than the circumference of the components and is at this stage wrapped around the bottom of the components and over a major portion of the circumferentially extending periphery of the components. Under these circumstances, a top opening is defined between the marginal side edges of the first wrapper and is in communication with the space of predetermined size between the components. In order to assure the predetermined spacing of the components relative to the first wrapper, they may be suitably bonded thereto. The partially wrapped components pass through a particulate material dispensing station at which the spaces between components are filled with this material through the top opening. In order to increase the rate fill of the particulate material or if the nature of the material dictates to meet the desired production of the composite rod suction may be applied through the first wrapper below the discharge opening of the dispenser. This downward pull on the particulate material may be facilitated by rendering the wrapper porous. This may be done by pre-perforating the wrapper substantially along the longitudinal center thereof. On the other hand, the perforations may be formed on the machine and during the process at a location prior to the deposit of the components on the wrapper. The partially wrapped components and interposed particulate sections pass through a cleaning station and then into a second wrapping station at which a second wrapper of increased width is folded around the rod including the first wrapper and top opening. The marginal side edges of this wrapper are overlapped and suitably sealed together. The continuous rod is then subdivided into the desired length of rods which are then introduced into conventional filter tip machinery for forming cigarettes with a mouthpiece having two spaced components of certain character and interposed particulate section.

---

A number of attempts have been made at composite or multiple cigarette mouthpieces in which a central section is composed of loose adsorbent granules as, for example, granulated charcoal. Although it is desired that complete fill of the allocated space by the granules is obtained, the limitations of both apparatus and techniques have prevented optimum fill. The result has been, even on a commercial scale, that less than 100% fill has been obtained usually of an order of magnitude of less than 70%. Some experimental and unproven approaches have reached fills of 90% and less but have been unacceptable for one reason or another and more often than not an unclean product resulted, that is granules would be inadvertently present between the components and wrapper.

It is therefore a primary object of the present invention to provide a relatively clean composite cigarette mouthpiece having a loose particulate section of optimum fill of an order of magnitude of well over 90% and approaching 100%.

Another object is to provide a composite cigarette mouthpiece of this type by employing efficient apparatus capable of operating at very high production speeds.

A further object is to provide apparatus and method of this type which is capable of handling substantially any form of loose particulate material whether it be granulated, flaked, flocculent, or the like.

Other objects and advantages will become apparent from the following detailed description which is to be taken in conjunction with the accompanying drawings illustrating somewhat preferred embodiments of the invention and in which.

In the drawings, a particulate material filling attachment or modification 10 with dual wrapping is shown incorporated in the above identified filter rod making machine 12. As will be appreciated by those skilled in the art, and as will be evident from the above identified Patent No. 2,957,285, this commercially available machine includes two hoppers 14 for mouthpiece components consisting of plug lengths made of paper, cellulose, cotton or other selected material.

Each hopper is provided with feeding devices 16 which are substantially identical with respect to one another. An individual feeding device comprising a drum having flutes on its periphery is disposed at the bottom of the associated hopper and is positioned to receive plug lengths in the flutes. The drum is provided with a number of circumferentially extending grooves into which rotating disc knives extend so as to subdivide each plug length into smaller separate individual lengths. An endless chain conveyor having pusher pieces is disposed beneath the drum so that as the drum rotates the pusher piece enters a flute so as to remove the cut plug lengths in a substantial continuous line. A guide associated with the trailing end of the chain conveyor serves to elevate the individual plug lengths at which point a rotatable disk also provided with pushers is adapted to feed the raised plug length in an arcuate path onto a perforated suction conveyor band 18. The band picks up these plug lengths and retains them in place through the operation of the applied suction. This conveyor band is also timed with the pusher disk associated with the second hopper so that plug lengths delivered from this hopper enters the spaces between successive plug lengths carried to and disposed on the conveyor from the feeding device associated with the first hopper. Following the intermeshing or interdigitating of the individual plug lengths, they are arranged in substantially preset spaced relationship before passing through the particulate material filling and dual wrapping attachment 10.

At this stage, the spaced components are transferred to the leading end of the particulate material filling and dual wrapping attachment 10 by a helical transfer drum 20. This drum 20 serves to transfer the spaced components over a stationary bridge 22 onto the web of the initial or first wrapper 24 which is suitably fed and supplied from roll 26. This first wrapper is driven by a wrapper tape conveyor 28 at a predetermined speed in relation to the travel of the components deposited thereon to provide a predetermined spacing between components that has been selected for the length of the particulate material section.

The first wrapper 24 is of a wdith slightly less than the circumference of the components for purposes that will become apparent shortly whereby a top opening 30 (see FIG. 6) is defined by the marginal side edges of the first wrapper folded about the lower circumferentially extending periphery of the spaced components. The material selected for the wrapper may be of a thermoplastic nature or selected from a wide variety of other materials including plastics, paper or the like, which will provide an essentially self-supporting rod prior to introducing the particulate material into the spaces between components. This will assure a uniform cross-section of rod prior and subsequent to the filling operation.

The selected spacing of the components on the first wrapper 24 is maintained by the endless belt 32. A bar 34 thereafter continues to maintain this relationship as the first wrapper 24 and associated components are fed into a first wrapper folder 36. This folder 36 folds the first wrapper around the lower circumferentially extending periphery of the spaced components to form a partially wrapped rod having a cross-section of the type shown in FIG. 6.

Figures 1, 2, 3:
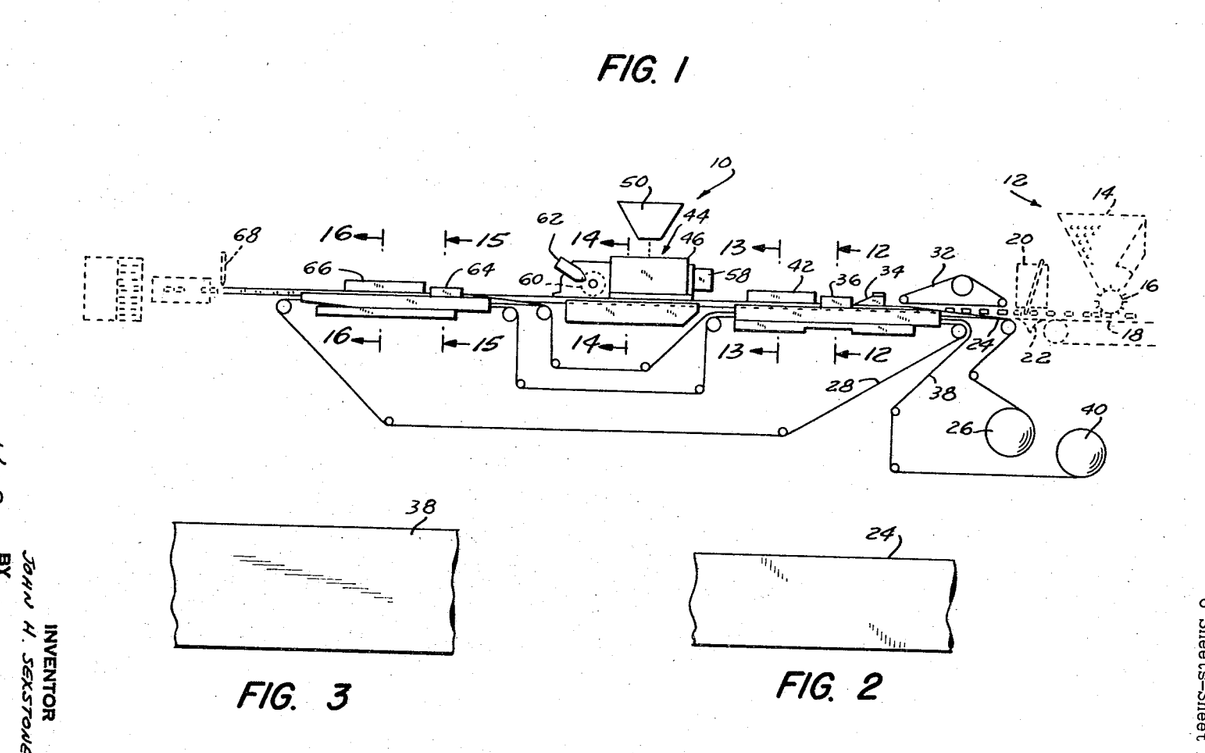
FIG. 1 is a side elevational view of a particulate material attachment and dual wrapping modification of a composite filter making machine of the type commercially known as Molins D.A.P.T.C. Machine supplied by Molins Machine Co., Ltd. of London, England, and generally disclosed in U.S. Patent No. 2,957,285 of Oct. 25, 1960, as well as others including commonly assigned U.S. Patent No. 3,343,462 and No. 3,357,320 the disclosures of which are herein incorporated by reference.
FIG. 2 is a fragmentary plan view approximately to scale of the first wrapper.
FIG. 3 is a similar view of the second wrapper.
Figure 4:
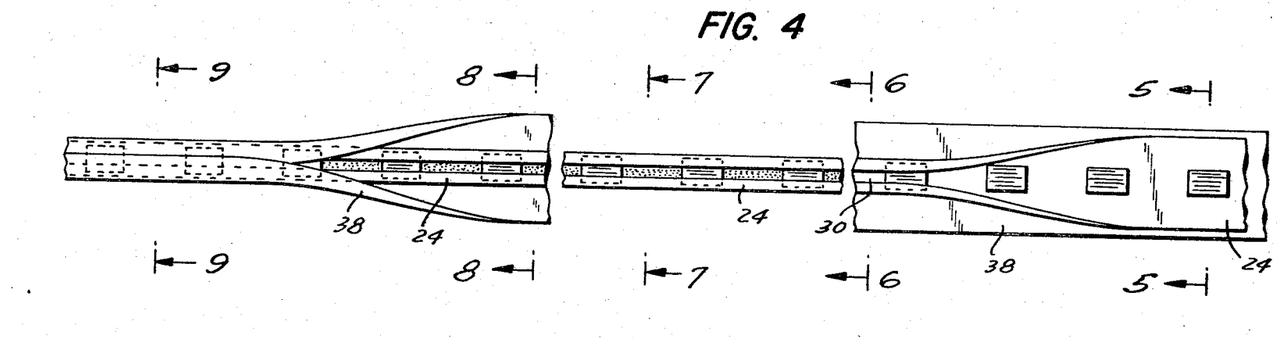
FIG. 4 is a fragmentary top view of both wrapping stations and the interposed particulate material filling station.

In the embodiment of the invention of FIG. 1, a final or second wrapper 38 emanating from roll 40 is also introduced with the first wrapper 24 and fed by tape conveyor 28. The second wrapper 38 is disposed beneath the first wrapper 24 and over tape conveyor 28. Both the tape conveyor web and final wrapper web remain divergent and are not folded with the initial wrapper 24 by the folder 36.

Figure 13:
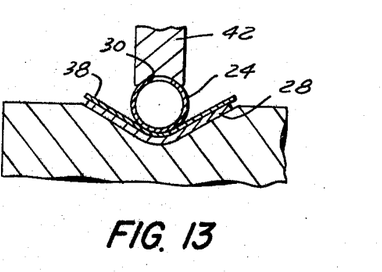
FIG. 13 is an enlarged fragmentary cross-sectional view taken along the line 13—13 of FIG. 1 showing heating the marginal edges of the initial wrapper to secure the components thereto.

The partially wrapped rod is now fed through a heater 42 which serves to fuse or otherwise suitably secures or bonds the spaced components to the termoplastic initial wrapper 24. This securement may be at the marginal side portions of the first wrapper 24, as shown in FIG. 13, or may be throughout the entire associated surfaces of the first wrapper and components. Where other than thermoplastic material is employed, the first wrapper may be suitably bonded to the components by an adhesive of a type well known to the trade.

The partially wrapped rod with secured components passes through a loose particulate material filling station 44. The filling station 44 includes a particulate material hopper 46 adapted to contain the selected particulate material of predetermined proportion, form and characteristics at a regulated level. In this connection, a photo cell or other suitable level sensing device 48 of commercially available construction is associated with the hopper 46 to sense the level of the particles therein. When the elevation of the particles falls beneath a predetermined level, the photo cell device will trigger a particle feed mechanism 50, shown diagramaticaly, to dispense particles into the hopper 46 to a certain level at which the particle feed will stop. A satisfactory mechanism 50 with photo cell 48 may be obtained commercially under the name Syntron Vibra-Flow weeder, manufactured by the Syntron Company, Homer City, Pa. Also other types of feeders such as a screw type feeder may be used.

Figures 14, 15:
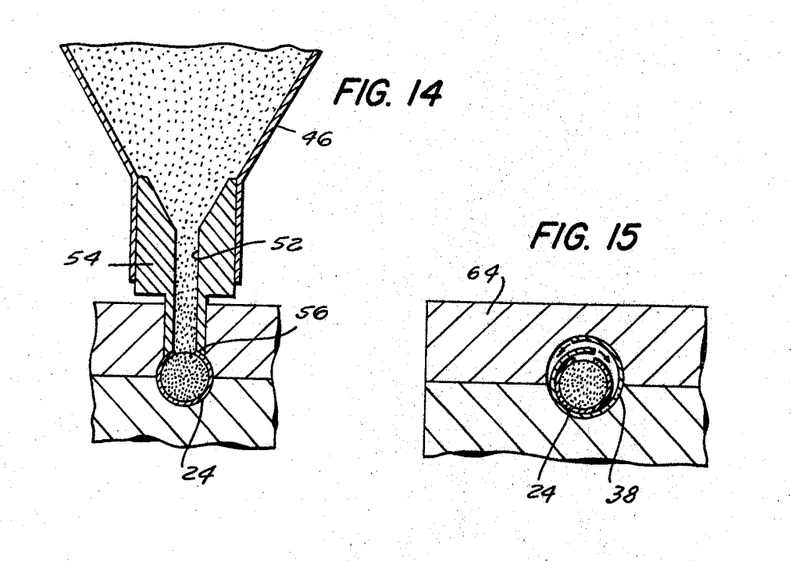
FIG. 14 is an enlarged cross-sectional view taken along the line 14—14 of FIG. 1 illustrating the particulate material filling step.
FIG. 15 is an enlarged cross-sectional view taken along the line 15—15 of FIG. 1 showing the manner in which the final wrapper is applied and the folder therefor.
Figure 16:
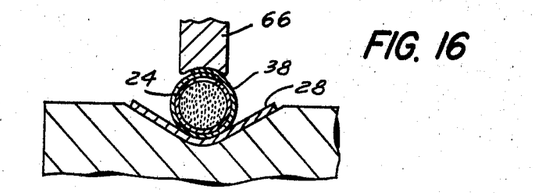
FIG. 16 is an enlarged cross-sectional view taken along the line 16—16 of FIG. 1 showing heating the overlapped marginal side edges of the second wrapper to secure these edges together.

In this manner, a certain quantity of particulate material is assured in hopper 46 thereby maintaining a certain pressure at the base of the hopper from which the particles are dropped while under the influence of gravity into the space between components. Under these circumstances, regulation of pressure will have the effect of regulating the amount of particles and their compactness between components. The particles at the base of the hopper 46 are adapted to be dispensed through an elongated slot 52 defined by bar 54. The upper portion of the slot 52 is divergent in an upward direction, as shown in FIG. 14, to facilitate passage of the particles therethrough. The lower edge 56 of the bar 54 is provided with a radius as shown in this figure to conform to the curvature of the wrapped upper side edge of first wrapper 24. Of course, sufficient clearance should be provided to permit free travel of the plug sections. The width of the lower end of the slot 52 approaches the width of the top opening 30 defined by the first wrapper 24 thereby conforming the path of descent of the particles and assuring their disposition between the spaced components. This dispensing operation may be further enhanced by employing a vibration mechanism 58 and accordingly reduce any tendency of the particles forming undesirable masses, clumps or the like.

The filling station 44 is also provided with a powered rotary brush 60 which is adjustable in elevation and located at the downstream end of the hopper 46 to operate to clean off any surplus particle or particles that may be on the exterior of the partially wrapped rod without effecting the particle within the confines of the spaces between components and first wrapper 24. Of course, a vacuum or suction type of cleaning device may be substituted and has been successfully employed in the present invention. A vacuum type cleaner or collector 62 is adapted to remove the excess particles from the bristles of the brush.

As will be apparent from FIG. 1, the web conveyor 28 together with second wrapper 38 is diverted in order to by-pass the filling station 44. Strategically located rolls may be employed for such purpose.

The partially wrapped rod is then fed into the second or final folder 64 which folds the second wrapper 38 completely about the rod in a manner depicted in FIG. 15. The marginal side edges of the second wrapper are in overlapped relationship completely embracing the exterior surfaces of the first wrapper 24 and closing the top opening 30. The overlapped marginal side edges of the second wrapper may then be secured through the use of a seam paster of the type well known in the trade or through the use of a thermoplastic second wrapper and operation of heater 66 which fuses or bonds the overlapped edges together.

Figures 5, 6, 7, 8, 9, 10:
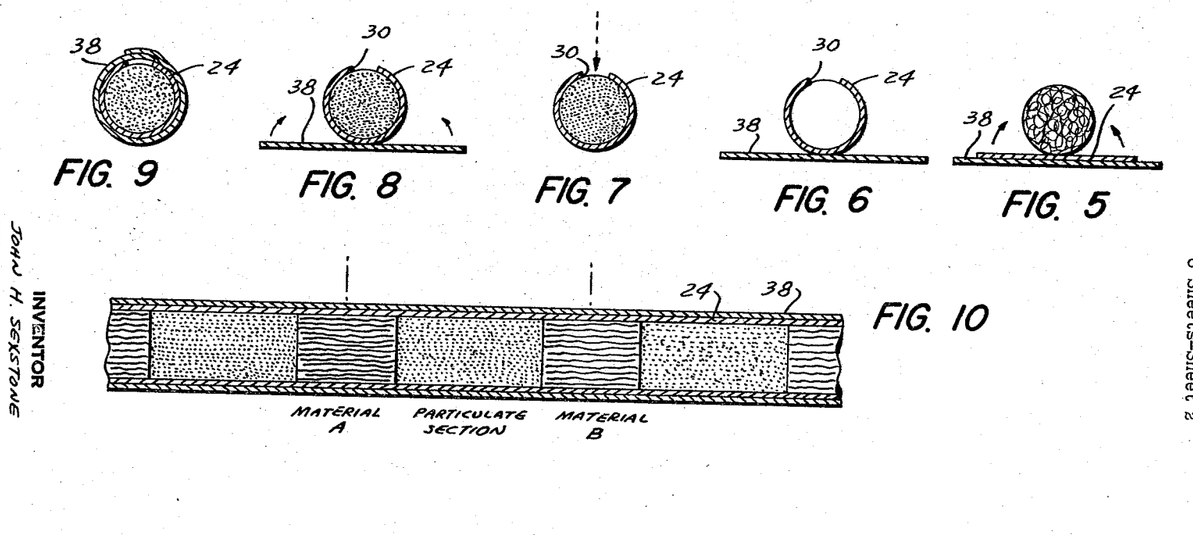
FIG. 5 is an enlarged cross-sectional view taken along the line 5—5 of FIG. 4 showing the spaced components of certain character on the initial or first wrapper prior to folding thereof.
FIG. 6 is an enlarged cross-sectional view taken along the line 6—6 of FIG. 4 showing the initial wrapper folded about the spaced components.
FIG. 7 is an enlarged cross-sectional view taken along the line 7—7 of FIG. 4 showing the introduction of the particulate material in the initial wrapper through the top opening thereof.
FIG. 8 is an enlarged cross-sectional view taken along the line 8—8 of FIG. 4 showing the filled inner wrapper superimposed on the second or final wrapper prior to folding the latter about the inner wrapper and over the top opening defined thereby.
FIG. 9 is an enlarged cross-sectional view taken along the line 9—9 of FIG. 4 showing the final wrapper completely folded with its overlapped marginal side edges suitably secured to one another.
FIG. 10 is an enlarged longitudinal sectional view through the completely wrapped composite cigarette mounthpiece rod of this invention.

The completely wrapped rod is then passed through a conventional cut-off device 68 which operates to cut the dual wrapped filter rod into predetermined lengths. These lengths are subsequently placed in conventional filter-tip attachment machinery adapted to secure composite mouthpieces on cigarettes which, according to the teachings of this invention and as shown in FIG. 10, will include material A, particulate section and material B arrangement where material B may be the same as or different from material A and may be the same or of unequal length. The particulate section may be of different lengths depending on the material selected and requirements and may be selected from a wide variety of materials whether granular, powdered, flaked, flocculent or the like or combination thereof which may include but are not necessarily limited to charcoal, alumina, silica gel, appropriate resins that may be modified or supplied with selected additives or other suitable filtering materials.

Figure 17:
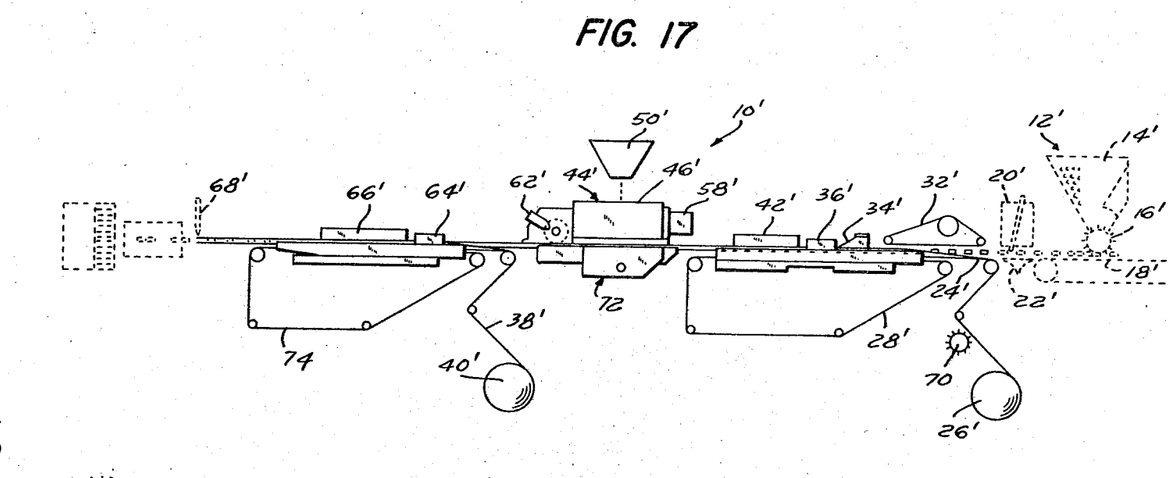
FIG. 17 is an elevational view similar to FIG. 1 showing a modification thereof in which an initial wrapper perforator is incorporated for increasing the porosity of this wrapper so that suction may be applied at the particulate material filling station for increasing the rate of fill of the spaces between components.

The physical nature of certain of the particulate materials may not lend themselves readily to the relatively high production speeds contemplated by this invention. With this in mind, a suction means may be incorporated at the particle filling station to increase the rate at which the spaces between components are filled. This may be accomplished in the machine of the embodiment of FIG. 1 as illustrated in FIG. 17. The latter embodiment also serves to show the manner by which the second wrapper may be introduced subsequent to the filling of the spaces between components at the filling station. Accordingly, like parts will be similarly numbered with accompanying primes.

Figure 18:
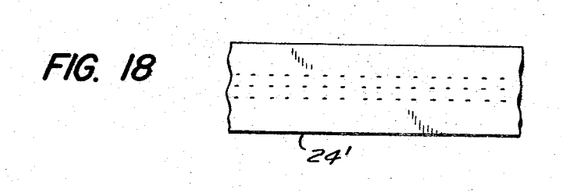
FIG. 18 is a view similar to FIG. 2 showing the perforated first wrapper which may also be supplied in this manner.

Thus, the first wrapper of this embodiment is preferably porous or perforated which may be initially supplied in this condition. On the other hand, the first wrapper may be perforated, as shown in FIG. 18, by the perforating mechanism 70. The perforations may be located between the marginal side edges of the first wrapper 24' along substantially the longitudinally extending center or axis.

Figure 11:
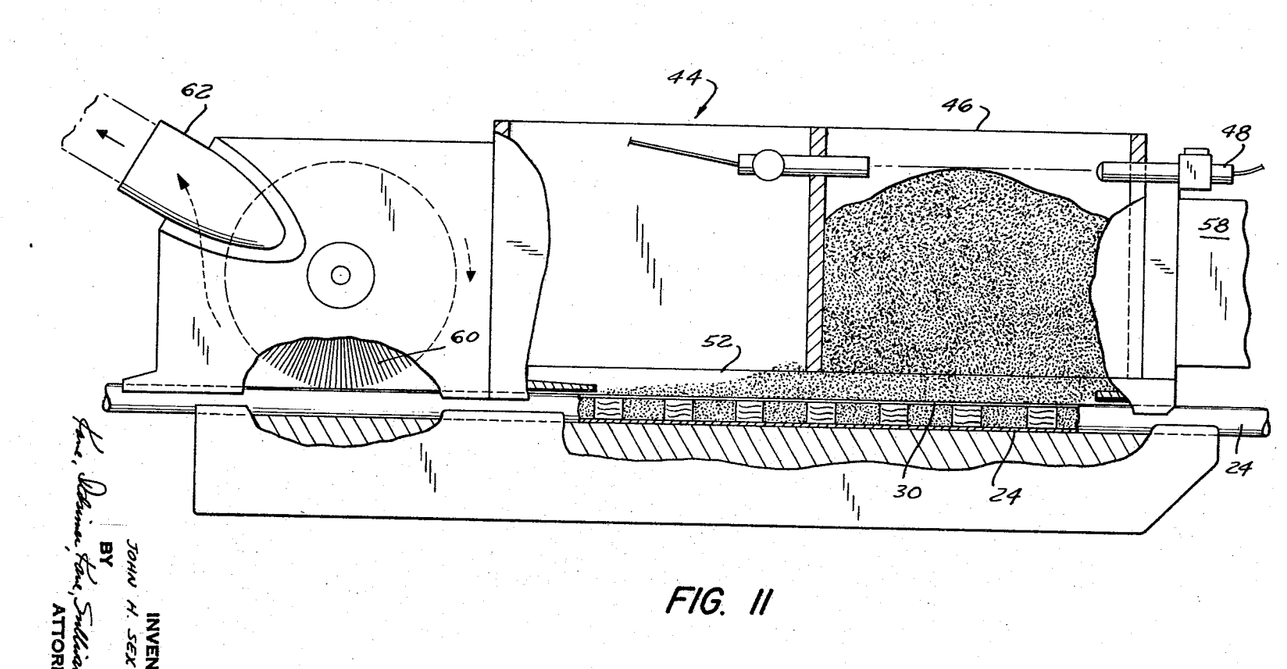
FIG. 11 is an enlarged fragmentary elevational view partly in section of the particulate material filling station.
Figure 12:
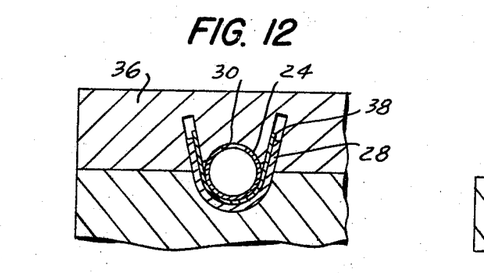
FIG. 12 is an enlarged fragmentary cross-sectional view taken substantially along the line 12—12 of FIG. 1 illustrating the initial wrapper folder.
Figures 19, 20:
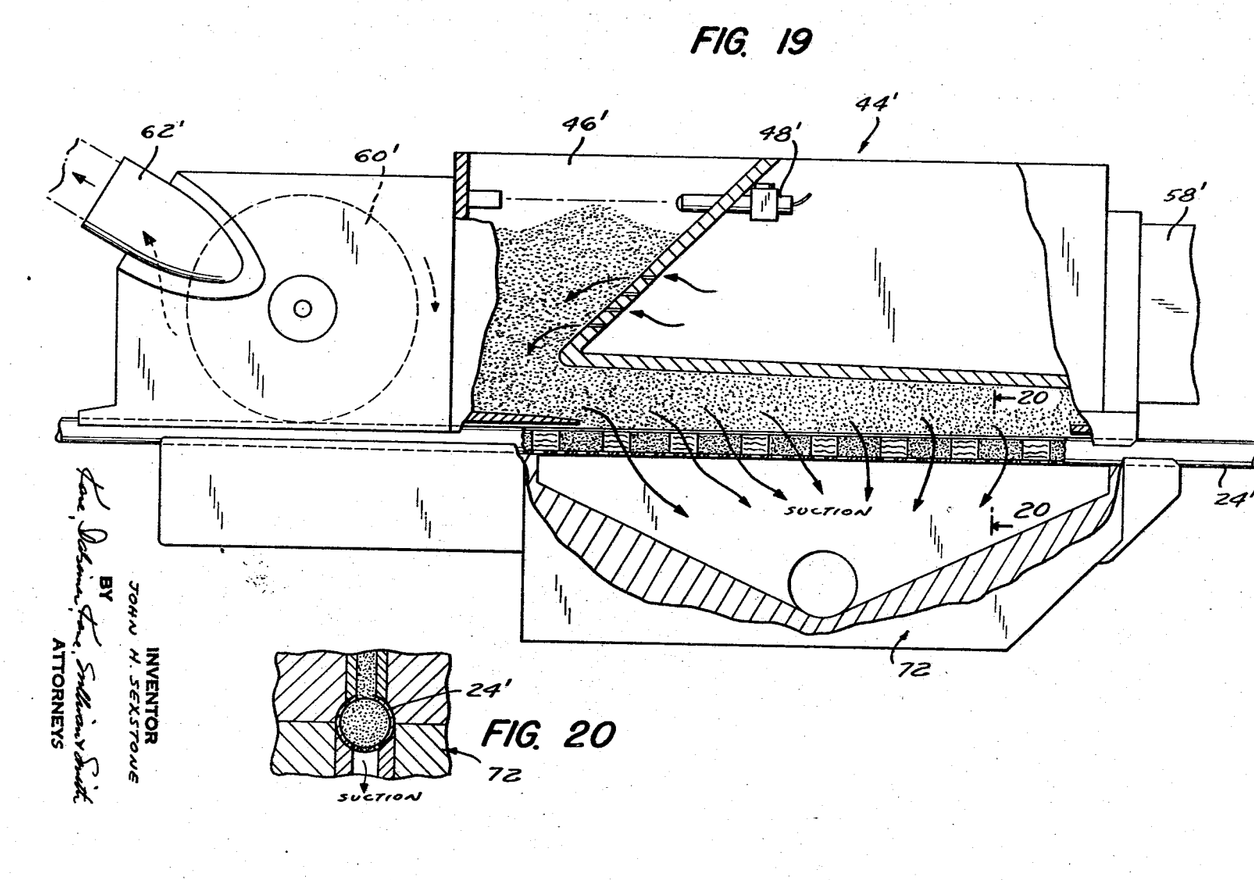
FIG. 19 is a view similar to FIG. 11 of the modified machine of FIG. 17 showing the particulate material filling station having a suction means incorporated therein.
FIG. 20 is a cross-sectional view taken along line 20—20 of FIG. 19.

The partially wrapped spaced components leaving the folder 36' and heater 42' pass through particle filling station 44' which may have a hopper 46' of the construction of FIG. 11 or of the modified construction of FIG. 19. In the lower right end of the latter figure, it will be seen that the hopper is provided with a venturi chamber which increases the velocity of the particles traveling to the chambers reduced end. The provision of this chamber across a major part of the length of the hopper keeps the weight of the particles in the hopper off the lower particles over most of the traveling rod. This is important in handling finer, flaked or flocculent types of particulate material. The side walls of the hopper may be provided with small openings, as shown, to provide air passages and to help agitate the particles in the hopper while under influence of suction. As the spaces between components are filled, the particles are acted upon by suction pulled through the porous or perforated first wrapper 24' and emanating from the suction mechanism 72.

The filled partially wrapped rod is fed into the second wrapping station and onto the second wrapper 38' which is first introduced into the machine at this location. The feeding of the second wrapper 38' is facilitated by its own independent tape conveyor 74.

The completely wrapped rod is then fed through cut-off device 64' and cut into predetermined lengths as in the previous embodiment.

Thus, the several aforenoted objects and advantages are most effectively attained. Although several preferred embodiments of the invention are disclosed and described in detail herein, it should be understood that this invention is in no sense limited thereby and its scope is to be determined by that of the appended claims.

I claim:

1. A method of making cigarette-mouthpiece rods that are divisible into individual mouthpieces having a particulate component in line with other components, said method comprising the steps of:

feeding said other components endwise in line;
   spacing these components a predetermined distance from one another;
   partially enclosing them in a continuous first wrapper and in spaced relation to define a space between components of predetermined size with the first wrapper defining an opening along its top through which the particulate material may pass into the spaces between the spaced other components;
   providing a source of the particulate material;
   passing the partially enclosed components in the first wrapper beneath the source of the particulate material;
   introducing the particulate material into the space between the spaced other components through the top opening defined by the initial wrapper; and
   completing the wrapping of the composite rod by sealing a second wrapper about the components and first wrapper and over the top opening, thereby forming a continuous composite rod.

2. The invention in accordance with claim 1 wherein the spaced other components are of different character.

3. The invention in accordance with claim 2 wherein one of the spaced other components is paper and the other is cellulose acetate.

4. The invention in accordance with claim 1 wherein the spaced other components are of different lengths.

5. The invention in accordance with claim 1 wherein the spaced other components are of double length and the completely wrapped continuous rod is subdivided by cutting it at intervals to thereby produce rods of which contains at least one particulate section.

6. The invention in accordance with claim 5 wherein the continuous rod is subdivided by cutting each of the double length components approximately on center to thereby provide individual mouthpieces having a particulate section between sections of different character.

7. The invention in accordance with claim 1 wherein the source of particulate material is in direct communication with the spaces between components and the particulate material is introduced into the spaces directly from the source.

8. The invention in accordance with claim 7 wherein the amount of particulate material introduced in the space is regulated by removing excess particulate material.

9. The invention in accordance with claim 7 wherein suction is applied to the spaces between components as the particulate material is introduced therein to expedite the rate at which the particulate material fills the spaces.

10. The invention in accordance with claim 1 wherein the components are secured to the initial wrapper prior to the introduction of the particulate material.

11. The invention in accordance with claim 1 wherein the initial wrapper with partially enclosed spaced components therein is substantially self-supporting upon receipt of the particulate material.

12. The invention in accordance with claim 1 wherein the initial wrapper is at least partially formed of thermoplastic material.

13. The invention in accordance with claim 12 wherein the outer wrapper also at least is partially formed of thermoplastic material.

14. The invention in accordance with claim 1 wherein the initial wrapper is air permeable and suction is drawn therethrough as the particulate material is introduced into the spaces between components to thereby increase the rate at which the spaces are filled with particulate material.

15. The invention in accordance with claim 14 wherein the initial wrapper is perforated substantially along its length approximately midway between its longitudinally extending marginal edges.

16. The invention in accordance with claim 15 wherein the initial wrapper is perforated during the method as it is fed from its source and before receipt of the spaced components.

17. Apparatus for making composite cigarette-mouthpiece rods containing components of predetermined character and each of which rods is divisible into individual mouthpieces for cigarettes with each of said mouthpieces including two parts of said certain character, said apparatus comprising:
    feed means for feeding the components of certain character;
    conveyor means for conveying said components to an initial wrapping station;
    initial wrapping means at said station for partially enclosing the components in a continuous wrapper, and in predetermined spaced relationship with spaces between components of predetermined size and with the wrapper defining a top opening communicating with the spaces between components;
    a source of particulate material;
    particulate material dispensing means coupled with the source for introducing particulate material into the spaces between components;
    suction means for applying suction through the wrapper to expedite the filling of the spaces between components with particulate material; and
    means for completing the enclosure of the spaced components and interposed particulate material with wrapping material to form a continuous composite rod.

18. The invention in accordance with claim 17 wherein a source of the wrapper is provided in roll form and the web of the roll of the wrapper extends to the initial wrapping station, and the web of the wrapper having means for rendering it porous to facilitate the drawing therethrough of the suction by the suction means.

19. The invention in accordance with claim 18 wherein perforating means are provided for perforating the web of the wrapper substantially along the longitudinal center thereof and at a location between the roll and initial wrapping station.

20. The invention in accordance with claim 18 wherein the wrapper is pre-perforated along its longitudinal center.

21. Apparatus for making composite cigarette-mouthpiece rods containing components of predetermined character and each of which is divisible into individual mouthpieces for cigarettes with each of said mouthpieces including two parts of said certain character, said apparatus comprising:
    feed means for feeding the components of certain character;
    conveyor means for conveying said components to an initial wrapping station;
    first wrapping means at said station for partially enclosing the components in a first continuous wrapper and in predetermined spaced relationship with spaces between components of predetermined size and with the first wrapper extending over a major part of the exterior circumferentially extending surface of the components but short of the entire circumferentially extending periphery of the components and defining a top opening communicating with the spaces between components;
    a source of particulate material;
    particulate material dispensing means coupled with the source for introducing particulate material into the spaces between components; and
    second wrapping means for applying a second wrapper completely around the first wrapper and over the top opening to encase the particulate material in the spaces between the components to thereby produce a continuous composite rod having a particulate section between components of certain character.

22. The invention in accordance with claim 21 wherein said feeding means includes a pair of hoppers for rods of material of the selected certain character, a device associated with each hopper for cutting the rods to certain length to form said components and feeding the components to the conveyor means, and means for interdigitating the components from one hopper with those from the other hopper.

23. The invention in accordance with claim 22 wherein the conveyor means includes a suction belt for receiving and conveying the rods in spaced interdigitated relation.

24. The invention in accordance with claim 21 wherein the first wrapping means includes a roll of the first wrapper material the web of which extends to the first wrapping station and is adapted to receive thereon the components conveyed by the conveyor means, and means for driving this web of the first material at a predetermined speed relative to the speed of the conveyor means to provide a selected predetermined space between components on the first wrapper.

25. The invention in accordance with claim 24 wherein the first wrapping means includes a folder which forms the first wrapper around the spaced components.

26. The invention in accordance with claim 25 wherein the first wrapping means includes a hold down means for holding the plugs down on the first wrapper at a location immediately before the folder.

27. The invention in accordance with claim 25 wherein the first wrapping means includes securing means for securing the spaced components to the first wrapper.

28. The invention in accordance with claim 27 wherein the first wrapper includes thermoplastic material and the securing means is a heater for applying heat to the thermoplastic material and thereby bond the first wrapper to the components.

29. The invention in accordance with claim 24 wherein the web of the first wrapper has means for rendering it porous to facilitate the drawing therethrough of suction for increasing the rate at which the spaces between components are filled with the particulate material.

30. The invention in accordance with claim 29 wherein perforating means are provided for perforating the web of the first wrapper substantially along the longitudinal center thereof and at a location between the roll and initial wrapping station.

31. The invention in accordance with claim 29 wherein the first wrapper is pre-perforated along its longitudinal center.

32. The invention in accordance with claim 29 wherein suction means are provided below the particulate dispensing means for applying suction through the first wrapper for increasing the rate at which the spaces between components are filled with the particulate material.

33. The invention in accordance with claim 20 wherein vibration means are associated with the dispensing means for vibrating the dispensing means to thereby optimize dispensing of the particulate material into the spaces between components.

34. The invention in accordance with claim 21 wherein cleaning means are provided adjacent the dispensing means for removing excess particulate material from the exterior of the partially wrapped components.

35. The invention in accordance with claim 21 wherein the second wrapper means includes a roll of the second wrapper the web of which is fed together with and superimposed under the first wrapper at a location substantially at which the components are received on the first wrapper.

36. The invention in accordance with claim 35 wherein means are provided for folding the first wrapper about the spaced components independently of the second wrapper about the components at substantially the location of the first wrapping means.

37. The invention in accordance with claim 35 wherein means are provided for diverting the second wrapper away from the first wrapper and the suction means as well as the particulate material dispensing means and then subsequently superimposing the second wrapper under the partially wrapped rod substantially at the location of the second wrapping means.

38. The invention in accordance with claim 21 wherein the second wrapper means includes a roll of the second wrapper the web of which is superimposed under the partially wrapped rod substantially at the location of the second wrapping means.

39. The invention in accordance with claim 1 wherein the second wrapper is fed together with and superimposed under the first wrapper approximately as the components are received on the first wrapper.

40. The invention in accordance with claim 39 wherein the first wrapper is folded independently of the second wrapper about the components at substantially the location of the first folding station.

41. The invention in accordance with claim 39 wherein the second wrapper is separated from and diverted away from the partially wrapped component as the spaces are filled with particulate material and the second wrapper is subsequently united with the partially wrapped components prior to the second wrapping operation.

42. The invention in accordance with claim 1 wherein the second wrapper is superimposed under the partially wrapped rod prior to the second wrapping operation.

References Cited
UNITED STATES PATENTS

| | | | |
|---|---|---|---|
| 3,343,462 | 9/1967 | Sexstone | 93—1 |
| 3,357,321 | 12/1967 | Hall | 93—1 |

BERNARD STICKNEY, Primary Examiner

U.S. Cl. X.R.

131—10.7, 61